UNITED STATES PATENT OFFICE.

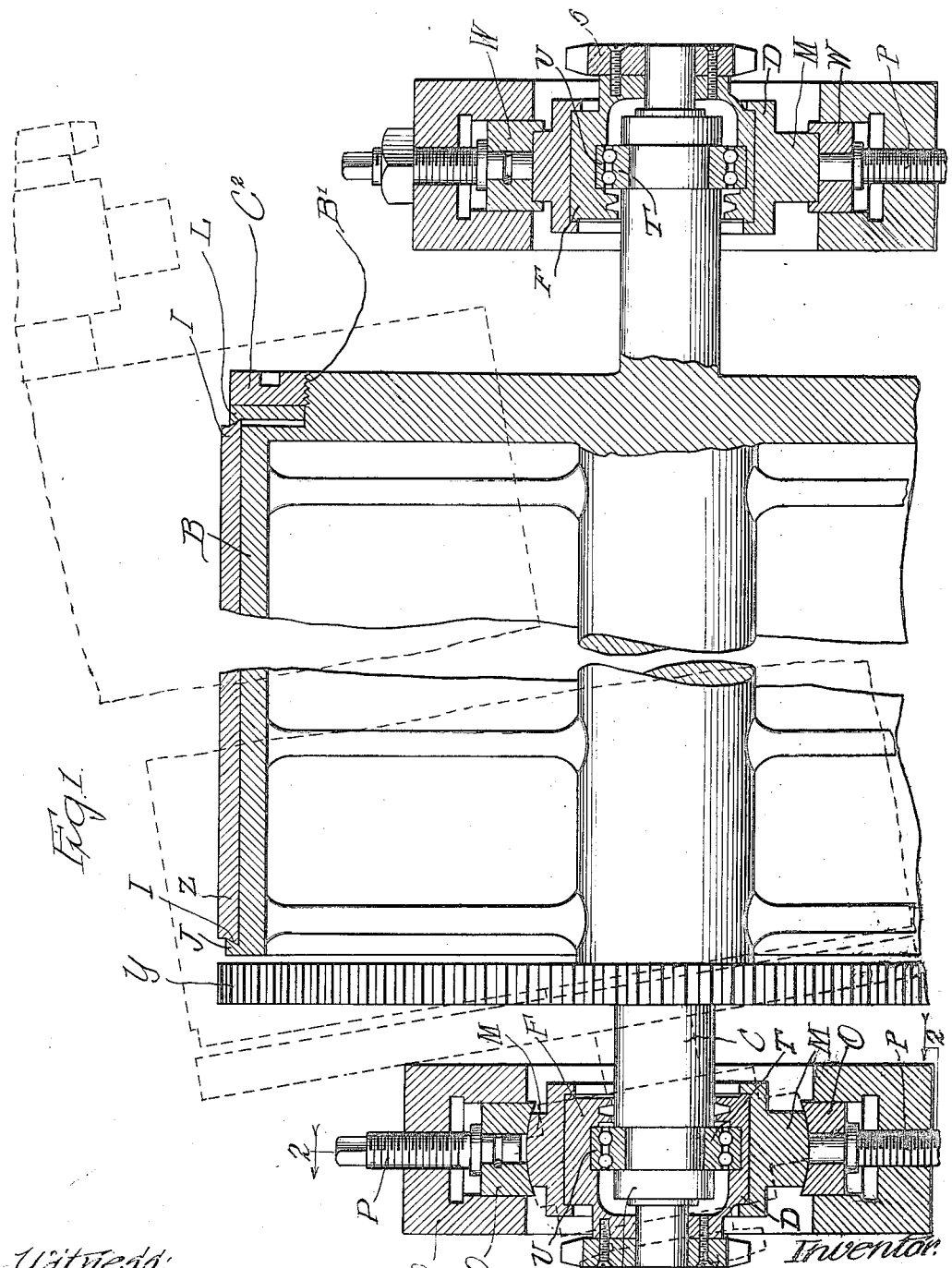

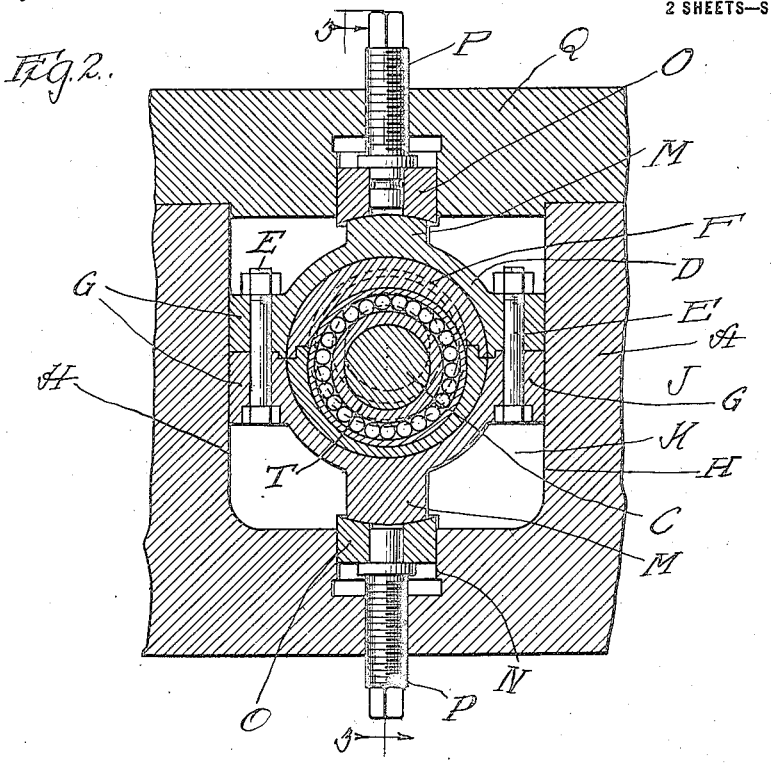
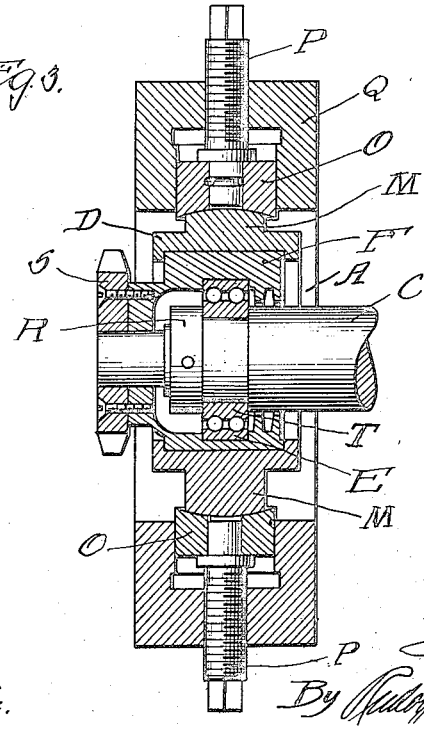

GUSTAV A. FRIESS, OF CHICAGO, ILLINOIS.

CYLINDER-MOUNTING FOR PRINTING-PRESSES.

1,227,774. Specification of Letters Patent. Patented May 29, 1917.

Application filed April 4, 1916. Serial No. 88,823.

*To all whom it may concern:*

Be it known that I, GUSTAV A. FRIESS, subject of the Emperor of Germany, residing at Chicago, in the county of Cook and State of Illinois, have invented certain new and useful Improvements in Cylinder-Mountings for Printing-Presses; and I do hereby declare the following to be a full, clear, and exact description of the invention, such as will enable others skilled in the art to which it appertains to make and use the same.

This invention has for its object to provide certain new and useful improvements in printing presses and more particularly in so-called cylinder-presses in which the printing is done by means of a cylindrical plate carrying the type, cuts and the like, from which impressions are to be made during the rotation of said cylinder, and which is mounted on the printing cylinder in the shape of a jacket.

The particular object of the present invention is to provide a mounting for the printing cylinder of a press which will permit said cylinder to be tilted to a position permitting the plate or jacket to be removed or mounted without removing the cylinder from the press, or in any manner affecting the adjustments of said cylinder and the bearings therefor.

In the accompanying drawings illustrating a suitable embodiment of the invention:

Figure —1— is a fragmentary vertical transverse section through the frame of a cylinder printing press and printing cylinder thereof showing the mounting for said cylinder whereby tilting of the same is permitted.

Fig. —2— is a fragmentary vertical longitudinal section on the line 2—2 of Fig. —1—.

Fig. —3— is a detail vertical transverse section on the line 3—3 of Fig. —2—.

The frame of the printing press is provided on opposite sides with housings A for the bearings for the trunnions of the cylinder B. One of the trunnions C journaled in said bearings is annularly reduced and receives a collar R between which and an opposed shoulder a bushing T is received, the latter being provided with run-ways for balls interposed between the same and a companion bushing U in a bearing member. The latter consists of a split cylinder F, the outer circumferential face of which is eccentric to its inner circumferential face. The said member F is rotatably mounted in the bearing D consisting of the usual separable members secured together by means of bolts E passing through flanges G thereof.

The said housing A for the said bearing D is provided with a recess K, having parallel flat side walls H between which the ends of the flanges G of the bearing D are confined, said bearings D for both ends or trunnions of the cylinder B being thus vertically and horizontally movable in said housings A in an obvious manner.

The bearings D for the trunnions C of the cylinder B are provided with diametrically opposite projections M, one of which rests in a block O vertically movable in a recess N in the bottom wall of the recess K, and which is supported upon the set-screw P. The other of said projections M of each bearing is similarly engaged by a similar block O mounted in the cover member Q for the recess K, and which is adapted to be adjusted by means of another set-screw P. The outer ends of said projections M of one of said bearings D are sphero-convex and the opposed surfaces of the blocks O receiving same are sphero-concave, the radius of said surfaces being coincident with the axis of the bearing D and a transverse horizontal axis intersecting the first-named axis midway between the ends of said bearing D. By the engagement of the opposed concave and convex faces of the blocks O and projections M respectively, the said bearing D is held against longitudinal movement in the direction of the axis of the cylinder B, and by the engagement of the ends of the flanges G with the side walls of the recess K the bearing D is held against lateral movement in said recess K, as will be obvious.

The eccentric mounting of the trunnions C of the cylinder B constitutes no part of the present invention, but is fully described and claimed in a copending application filed the 4th day of April, 1916, Ser. No. 88,833.

The bearing for the right-hand trunnion of the cylinder is similarly constructed, except that the projections M thereof have flat end surfaces, the said projections being received in the flanged cups of the blocks W for holding said bearing against movement relatively to the press-frame in one direction.

The cover member for the bearing for the last-named trunnion of the cylinder is bolted in place, and is adapted to be removed whereupon the last-named bearing is adapted to be lifted out of its recess or housing without removing the same from the trunnion of the cylinder on which it is mounted, and said cylinder may thus be tilted, as shown in dotted lines in Fig. —1—, on the horizontal axis midway between the spherical surfaces of the projections M of the other bearing, and which extends transversely to the axis of said cylinder.

The drive-gear Y for the cylinder is mounted on that trunnion which is journaled in the tiltable bearing and between the end of the cylinder and the inner face of the housing for said bearing.

The printing plate or jacket Z for the cylinder B is provided at its ends with inclined surfaces I, one of which is adapted to bear upon the opposed surface of an annular flange J at the end of the cylinder nearest the tiltable bearing for one trunnion thereof. The said surface I at the other end of said jacket Z is adapted to be engaged by the similar opposed surface of a ring or collar L telescopically movable over the central projection B' at the other end of the cylinder B, the latter being threaded to receive the nut $C^2$ by means of which the ring L is moved to bear forcibly upon the end of the jacket Z. Obviously by tilting the cylinder B, as shown in dotted lines in Fig. —1—, and removing the nut $C^2$ and ring L the jacket Z may be easily removed and remounted, and the bearing for the trunnion at said end of said cylinder remounted in its housing and, by then replacing the cover for said housing, the cylinder will again assume its normal operative position. If a new jacket Z is mounted on the cylinder adjustment of the latter may be easily effected after the same has been replaced as aforesaid, by manipulating the several set-screws P in an obvious manner.

By means of this arrangement much time and labor in and about the removal and replacement of the jackets Z is economized.

I claim as my invention:

1. In a printing press having a cylinder adapted to receive removable printing jackets, a bearing for a trunnion of said cylinder mounted to rock on an axis transverse to the axis of rotation of said cylinder, the trunnion of said cylinder journaled in said bearing being engaged against longitudinal movement relatively thereto, a bearing for the other trunnion of said cylinder removably mounted in a housing and adapted to be lifted out of the same as the cylinder is tilted for mounting and demounting the printing jacket thereof.

2. In a printing press having a cylinder adapted to receive removable printing jackets, a housing for the bearing for one trunnion of said cylinder having parallel side walls between which said bearing is held against lateral movement, an adjustable support for said bearing in the bottom of said housing, an adjustable member in the top of said housing coacting with the adjustable support to hold said bearing against vertical movement, the opposed faces of said support and said member and the coöperating faces of said bearing engaged thereby having a curvature of the radius of the distance of said faces from the axis of rotation of said cylinder to permit the latter to be tilted on an axis transverse to its axis of rotation.

In testimony whereof I have signed my name in presence of two subscribing witnesses.

GUSTAV A. FRIESS.

Witnesses:
M. M. BOYLE,
IRVING COWLES.